United States Patent [19]
Moss

[11] 3,766,017
[45] Oct. 16, 1973

[54] SYNTHETIC SOLVENT STILL
[75] Inventor: Harry A. Moss, Cynwyd, Pa.
[73] Assignees: Helen S. Moss; Harry A. Moss, Cynwyd, Pa. ; part interest to each
[22] Filed: Nov. 4, 1971
[21] Appl. No.: 195,735

[52] U.S. Cl..................... 202/187, 202/197, 203/20, 159/23, 159/28
[51] Int. Cl............... B01d 3/00, F28b , B01b 1/02, B01d 19/02, B01d 1/00, B01d 19/00
[58] Field of Search................... 202/170, 186, 187, 202/189, 197; 203/20; 159/1 A, DIG. 4, 31, 43, 16 A, 16 S, 27 D, 1 C, 23, 28 R, 13 A; 252/359 E, 361

[56] References Cited
UNITED STATES PATENTS

| | | |
|---|---|---|
| 863,031 | 8/1907 | Lehnert............................ 202/264 |
| 1,257,854 | 2/1918 | Harris.............................. 159/31 X |
| 2,718,215 | 9/1955 | Bossert et al..................... 159/31 X |
| 3,057,786 | 10/1962 | Waddill................................ 203/20 |
| 3,711,070 | 1/1973 | Khokhlou et al............. 159/DIG. 4 |

Primary Examiner—Norman Yudkoff
Assistant Examiner—J. Sofer
Attorney—Frank J. Benasutti

[57] ABSTRACT

An Apparatus for the continuous distillation and recovery of cleaning fluid from a source of contaminated fluid has a chamber, a still within said chamber and a means to prevent "boil over" of the apparatus.

2 Claims, 2 Drawing Figures

SYNTHETIC SOLVENT STILL

BACKGROUND OF THE INVENTION

This invention relates to distillation equipment, and more particularly, to a still and related equipment for use in the dry cleaning industry in distilling synthetic solvent such as perchloroethylene.

In the prior art a wide variety of stills exist for this purpose. In one popular piece of apparatus a large tank is provided with a steam heated base. Dirty solvent is pumped into the steam heated tank which normally contains an aitator to keep the solvent moving as the sludge filters out and the solvent boils and is evaporated. The tank is generally vented so that some of the solvent vapors escape into the atmosphere causing air pollution. To my knowledge stills on the market in actual use are rather low capacity, low efficiency devices producing a low quality output.

SUMMARY OF THE INVENTION

It is my desire to provide by my invention a high output, high efficiency still which will produce a high quality product in a minimum of space without polluting the air.

My invention comprises an apparatus having a still of unique construction disposed in a recovery tank and having means for inhibiting foaming "boil over" during the process of distillation. Also provided is condensing and liquid solvent recovery means.

Accordingly it's an object of my invention to provide an apparatus of the type described for purifying cleaning fluid and this and other objects of my invention will become apparent from the following description with reference to the accompanying drawings.

DESCRIPTION OF THE PREFERRED EMBODIMENTS

Figure 1:
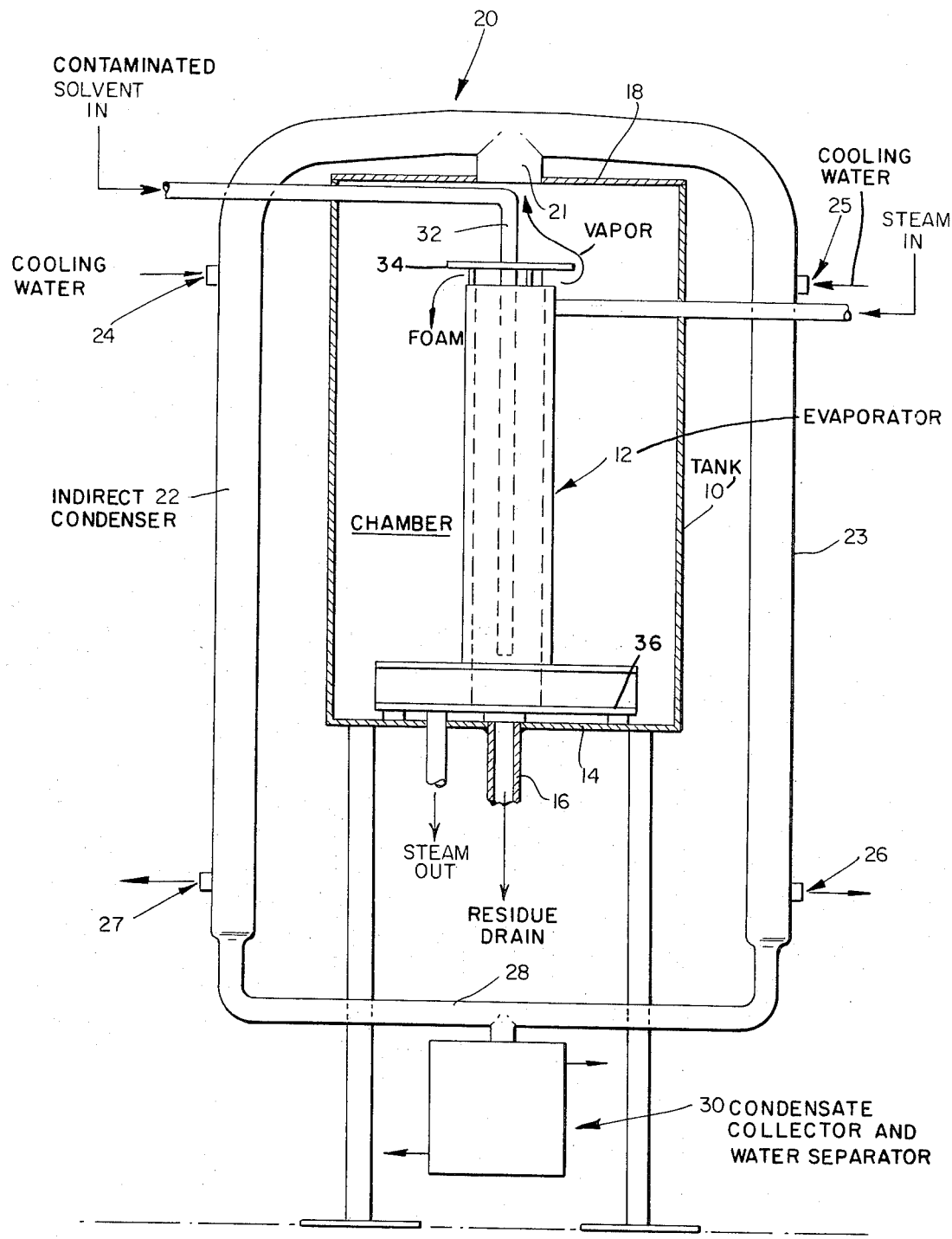
FIG. 1 is an over all schematic elevation of an apparatus in accordance with my invention.

Although specific forms of the invention have been selected for illustration in the drawings, and the following description is drawn in specific terms for the purpose of describing these forms of the invention, this description is not intended to limit the scope of the invention which is defined in the appended claims.

The overall apparatus as shown in FIG. 1 comprises a large substantially cylindrical tank 10 forming a chamber in which is mounted the basic evaporator means in accordance with my invention, designated generally 12. The cylindrical tank has a bottom plate 14 with a drain 16 (as indicated) for manual drainage of residue from the tank. The upper end of the tank has a plate 18 welded or otherwise suitably affixed to the side wall. The vapor collection means comprises an open tube 21 fixedly mounted in the plate 18 to receive the gaseous mixture evaporating from the evaporator (as will be described more fully hereinafter). This gaseous mixture passes through the tubing designated generally 20 and the side mounted, indirect condensers 22 and 23. These have not been shown in greater detail for purposes of the present application, since condensers are well known in the distillation art. The condensers have suitable piping (not shown) connected at the fittings generally designated 24, 25, 26 and 27 for the passage of cooling water therethrough to condense the gaseous mixture into a liquid form which then flows through the horizontal pipe 28 at the bottom of the apparatus. The liquid is then collected, and the water separated out as is well known in the art, in a collection means designated generally 30 from which it is then reintroduced through the cleaning plant.

Figure 2:
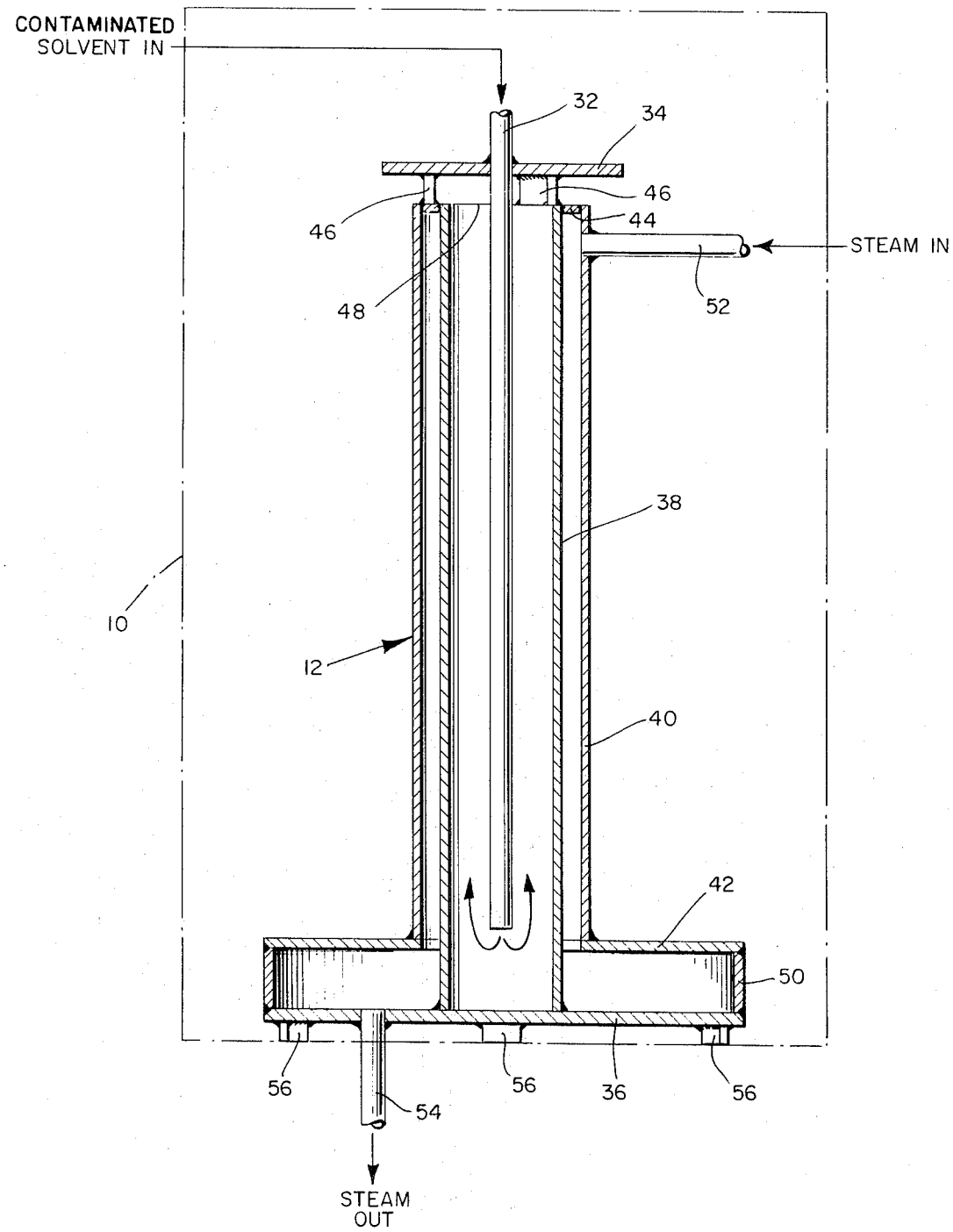
FIG. 2 is a greatly enlarged vertical section of a portion of the apparatus shown in FIG. 1.

As shown in both FIGS. 1 and 2 the dirty or contaminated liquid cleaning solvent is fed through a metering device (not shown) into the still apparatus at the top through a relatively small pipe 32 (on the order of ¼ inch in diameter). This pipe is retained in a flat plate 34 which is mounted above the chimney shaped portion, evaporator 12, and extends beyond the edges thereof. The solvent discharges from the lower end of the pipe 32 onto the base 36.

The means for supplying heat to evaporate this solvent comprises a steam jacket which I shall now describe in greater detail. The jacket comprises two cylindrical concentrically, vertically mounted tubes. The inner tube 38 is welded at one end to the base 36 as shown. The outer tube 40 is somewhat shorter and is welded to upper plate 42. The two tubes are connected together at the top by an annular member 44 which is welded to each of the tubes to provide a seal. This annular mmber supports the legs 46 which in turn support the plate 34 above and spaced from the open end 48 of the chimney shaped longitudinally extending container portion of the evaporator 12.

The upper plate 42 and base 36 are connected by an annular side wall 50 and are suitably welded so as to provide a substantially sealed container. Of course, the total steam jacket is opened at both ends to permit steam to enter through the pipe 52 and exit through the pipe 54 in the base 36. The base is supported by a plurality of legs 56, so that it stands above the base 14 of the tank 10 (shown in phantom lines in FIG. 2).

METHOD OF OPERATION

In the operation of this apparatus, it is desirable to preheat the steam jacket prior to feeding the solvent into the still. The steam is turned on first and the apparatus brought up to a desirable temperature depending on the quantity of solvent involved and the rate at which evaporation is to take place. These parameters can readily be determined by one skilled in the art. The cooling water should be turned on so that the condensers are functioning when vapor is introduced into them. Next the liquid solvent is fed in through the pipe 32 and allowed to drop onto the base 36 in the heated jacket. Note that the solvent is preheated in passing through the pipe 32. The solvent begins to evaporate and vapor, liquid and foam pass upwardly through the pipe 38, out the top 48, contact the plate 34 and then the vapors rise into the pipe 21 while the liquid and foam pass down along the outside of the pipe 40. The vapors pass into the condensers and are condensed and collected as a liquid.

During this process the solvent foams. The foam is beneficial to a certain extent in that it carries with it impurities. However, prior art devices were subject to "boil over" due to uncontrolled foaming; and this resulted in malfunctioning of the prior art apparatus. In the present invention adverse foaming action is prevented by the plate 34 spaced above the opening 48 in the chimney shaped portion of the evaporator 12. As the foam works its way up the pipe 38 it is inhibited from proceeding much beyond the open end thereof by the plate 34 and instead drips from the under side of the plate and runs down the outer sides of the outer tube 40 and onto the upper hot plate 42. In doing so, condensed or otherwise unevaporated solvent in the foam is caused to evaporate, thereby increasing the efficiency of the still. Thus, the percentage of solvent removed from the impure liquid is increased, while substantially only the impurities run down the side of the tube and on to the upper plate 42 and ultimately onto the bottom of the tank 14 and out the drain 16 from where the residue can be removed manually.

I have observed the operation of an apparatus in accordance with my invention which was installed on a test basis and have found that three times the quantity of liquid could be processed in the same time as prior art methods at a greatly increased quality even though the space necessary for processing was approximately only one-half that previously required.

It will be understood that various changes in the details, materials and arrangement of parts which have been described and illustrated in order to explain the nature of this invention, may be made by those skilled in the art within the principle and scope of the invention as expressed in the appended claims. In particular, more than one chimney shaped portion could be used with a common steam jacket base and suitable piping. Also the outer tank could be of a prior art type and have, for example, a built-in steam heated base.

While specific dimensions have not been given, the drawings are in proportion to the preferred embodiment.

It will be further understood that the "Abstract of the Disclosure" set forth above is intended to provide a nonlegal technical statement of the contents of the disclosure in compliance with the Rules of Practice of the United States Patent Office, and is not intended to limit the scope of the invention described and claimed herein.

What is claimed is:

1. A distilling apparatus, comprising:
   a. a chamber;
   b. an evaporator means within said chamber for receiving and evaporating solvent from a solvent-containing liquid and, in operation, causing said solvent to evaporate, leaving a foaming liquid residue; said evaporator means comprising a container extending longitudinally in the vertical direction, said container being open at its upper end to permit exiting of said foaming liquid and closed at its lower end and being embraced by a steam jacket;
   c. means for introducing a solvent-containing liquid into said container comprising a conduit suspended vertically in said container, said conduit terminating in an open end spaced from the closed end of the container so that fluid passing through said conduit will fall by gravity to said closed end;
   d. vapor collection means opening into said chamber for collecting the solvent vapor produced; and
   e. means juxtaposed with said evaporator means to prevent said foaming liquid from entering said vapor collection means.

2. The invention of claim 1 wherein said steam jacket comprises a substantially cylindrical body rising from a base which extends radially outwardly so as to be contacted by the foaming liquid which overflows said evaporator means and falls thereon by gravity.

* * * * *